Feb. 23, 1926.　　　　　　　　　　　　　　　　1,574,381
E. ENTENMANN
DRAWING CARRIAGE FOR DRAWING MACHINES
Filed Sept. 4, 1923
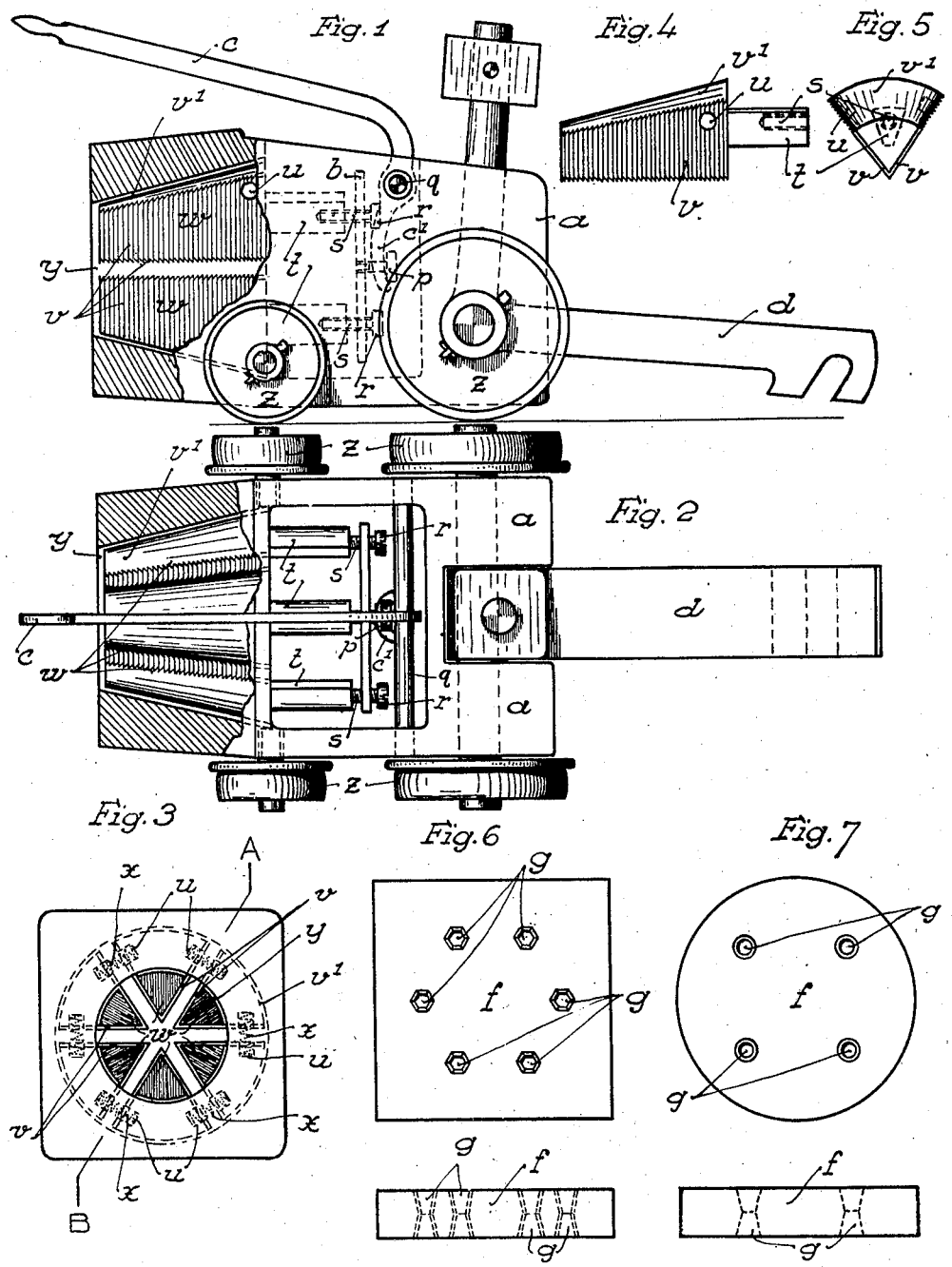

Patented Feb. 23, 1926.

1,574,381

UNITED STATES PATENT OFFICE.

EÜGEN ENTENMANN, OF STUTTGART, GERMANY.

DRAWING CARRIAGE FOR DRAWING MACHINES.

Application filed September 4, 1923. Serial No. 660,910.

*To all whom it may concern:*

Be it known that I, EÜGEN ENTENMANN, a citizen of the German Republic, residing at Stuttgart, Germany, have invented certain new and useful Improvements in Drawing Carriages for Drawing Machines, of which the following is a specification.

This invention relates to an arrangement on drawing carriages for drawing machines which permits drawing one or several, in this instance six rods, in one operation through a specially constructed drawing die so that wires of different diameters can be produced simultaneously.

The invention will be best understood from a consideration of the following detailed description taken in connection with the accompanying drawings forming a part of this specification, with the understanding that while on the drawing one embodiment of the invention is disclosed, the invention is not confined to any strict conformity with the showing of the drawings, but may be embodied in any manner which does not make a material departure from the salient features of the invention as expressed by the scope of the claims.

In the drawing:—

Fig. 1 is a side elevation of the drawing carriage.

Fig. 2 is a plan view of the same.

Fig. 3 is a face view of the carriage.

Figs. 4 and 5 show constructional details.

Figs. 6 and 7 show two forms of the die.

In a drawing carriage $a$ with rollers $z$ and hook $d$ designed to be hooked into the chain of the drawing bench, a system of sector-shaped jaws $w$ is arranged in a conical cavity $y$, said jaws being controlled by springs $x$ and having on their inner longitudinal faces teeth $v$ and cavities $u$ in which the said pressure springs $x$ are located. The springs $x$ serve to press the sector-shaped clamping jaws in outward direction so that their outer circumferences $v'$ are in contact with the inner wall of the conical cavity $y$.

In the form of construction shown by way of example six jaws $w$ are provided. The toothed faces of the jaws $w$ must be well tempered in order to avoid premature wear. Each jaw $w$ has an extension $t$ at the rear end. Each extension $t$ has a threaded bore $s$ designed to receive a screw $r$ screwed through a base plate $b$ with which all jaws are thus adjustably connected. A hand lever $c$ is mounted between lateral guide bolts $q$ of the drawing carriage. This hand lever $c$ is fork-shaped at its inner end at $c'$. The fork-shaped inner end $c'$ grips under a centrally arranged screw $p$ or other abutment so that the clamping jaws $w$ may be moved to and fro in the conical cavity $y$. If the hand lever $c$ is moved upward, the jaws $w$ are moved towards one another to clamp the rods which have been inserted. Only after the last rod has come out of the die, the jaws are moved back to release the rods inside the conical cavity. The drawing die may be circular, square or other shape and it consists of a plate $f$ with several drawing holes $g$ of convenient shape arranged in a circle and the position of which corresponds with the position of the six jaws of the drawing carriage.

In the manner described it has become possible to clamp and draw six rods simultaneously.

I claim:—

1. A drawing carriage for drawing machines for the drawing of several rods in one operation comprising in combination a carriage body having in its end face a conical cavity, a number of sector-shaped jaws in said conical cavity, springs for pressing said jaws in outward direction, a base plate in said carriage, means for adjustably fixing said jaws in said base plate, a hand lever for moving said jaws in said conical cavity so that they are pressed against one another and a drawing die for the rods to be drawn.

2. A drawing carriage for drawing machines for the drawing of several rods in one operation comprising in combination a carriage body having in its end face a conical cavity, a number of sector-shaped jaws in said conical cavity, springs for pressing said jaws in outward direction, a base plate in said carriage, means for adjustably fixing said jaws in said base plate, a hand lever for moving said jaws in said conical cavity so that they are pressed against one another and a drawing die for the rods to be drawn, said drawing die consisting of a plate of convenient shape having holes of convenient shape arranged in a circle around the centre of said plate so that the position of said holes corresponds with the position of said clamping jaws.

In testimony whereof I affix my signature.

EÜGEN ENTENMANN.